United States Patent
Born et al.

(10) Patent No.: US 12,405,652 B2
(45) Date of Patent: Sep. 2, 2025

(54) SYSTEM AND METHOD FOR CONTROLLING POWER CONSUMPTION IN PROCESSOR USING INTERCONNECTED EVENT COUNTERS AND WEIGHTED SUM ACCUMULATORS

(71) Applicant: Advanced Micro Devices, Inc., Santa Clara, CA (US)

(72) Inventors: Richard Martin Born, Fort Collins, CO (US); Gokul Subramani Ramalingam Lakshmi Devi, Santa Clara, CA (US); Michael L. Golden, Santa Clara, CA (US); Larry D. Hewitt, Austin, TX (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 0 days.

(21) Appl. No.: 17/358,709

(22) Filed: Jun. 25, 2021

(65) Prior Publication Data
US 2022/0413584 A1 Dec. 29, 2022

(51) Int. Cl.
*G06F 1/3228* (2019.01)

(52) U.S. Cl.
CPC .................. *G06F 1/3228* (2013.01)

(58) Field of Classification Search
CPC .................................................. G06F 1/3228
See application file for complete search history.

(56) References Cited

U.S. PATENT DOCUMENTS

| | | | |
|---|---|---|---|
| 2011/0185203 A1* | 7/2011 | Carlson | G06F 11/3058 713/320 |
| 2011/0291746 A1 | 12/2011 | Ibrahim et al. | |
| 2014/0013142 A1* | 1/2014 | Kalaga | G06F 1/3234 713/323 |
| 2014/0149078 A1* | 5/2014 | Lee | G06F 11/348 702/186 |
| 2016/0378172 A1 | 12/2016 | Alexander et al. | |
| 2019/0239384 A1* | 8/2019 | North | G06F 1/3296 |
| 2020/0341533 A1 | 10/2020 | Ho et al. | |
| 2021/0200580 A1* | 7/2021 | Yasin | G06F 9/4881 |
| 2022/0382353 A1* | 12/2022 | Brooks, Jr. | G06F 1/28 |

OTHER PUBLICATIONS

International Search Report and Written Opinion, PCT/US2022/034061 Oct. 10, 2022, 10 pages.

* cited by examiner

*Primary Examiner* — Paul Yen (57) ABSTRACT

Methods and systems for facilitating improved power consumption control of a plurality of processing cores are disclosed. The methods improve the power consumption control by performing power throttling based on a determined excess power consumption. The methods include the steps of: monitoring using at least one event count component in the respective processing core a plurality of distributed events; calculating an accumulated weighted sum of the distributed events from the event count component; determining an excess power consumption by comparing the accumulated weighted sum with a threshold power value; and adjusting power consumption of the respective processing core based on the determined excess power consumption.

17 Claims, 8 Drawing Sheets

SYSTEM AND METHOD FOR CONTROLLING POWER CONSUMPTION IN PROCESSOR USING INTERCONNECTED EVENT COUNTERS AND WEIGHTED SUM ACCUMULATORS

BACKGROUND OF THE DISCLOSURE

In complementary metal oxide semiconductor (CMOS) integrated circuits, in order to adjust power consumption, modern microprocessors have adopted dynamic power management using "P-states." A P-state is a voltage and frequency combination. An operating system (OS) determines the frequency to complete the current tasks and causes an on-chip power state controller to set the clock frequency and operating voltage accordingly. For example, if on average the microprocessor is heavily utilized, then the OS may determine that the frequency should be increased. On the other hand if on average the microprocessor is lightly utilized, then the OS may determine that the frequency should be decreased. The available frequencies and corresponding voltages for proper operation at those frequencies are stored in a P-state table. As the operating frequency increases, the corresponding power supply voltage also increases, but it is important to keep the voltage low while still ensuring proper operation.

Processor cores may use performance counters to make processing power measurements of specific events related to the instruction execution and data movement through the cores. Specifically, a digital power monitor (DPM) may use event counters to measure specific events in a core or group of cores over a corresponding time period and use them to calculate power consumed by the core during that time period. That calculated power can then be compared with the thermal design current (TDC) limit of the core or group of cores. Additionally, an electrical design current (EDC) monitor may use event counters to calculate current drawn by a core or group of cores and compare that to the EDC limit of that core or group of cores.

The integrated circuits need to complete separate runs or iterations of performance monitoring with respect to TDC and EDC, since they are two separate mechanisms that are associated with different time frames. TDC is the maximum electrical current sustainable over thermally significant time frames that are measured in milliseconds, for example, while EDC is the maximum electrical current sustainable over much shorter, non-thermally significant time frames that are measured in microseconds. Because completing separate runs for these constraints in view of their differing scales of time frame takes time and computing resources, there is a need to combine them together such that a single run of performance monitoring would be sufficient.

BRIEF DESCRIPTION OF THE DRAWINGS

The implementations will be more readily understood in view of the following description when accompanied by the below figures, wherein like reference numerals represent like elements, and wherein.

DETAILED DESCRIPTION OF IMPLEMENTATIONS

Briefly, systems and methods facilitate improved power consumption control of a plurality of processing cores by adjusting power consumption of the respective processing core with excessive power consumption. Specifically, the method of controlling power consumption of a plurality of processing cores includes the steps of: monitoring, using at least one event count component, a plurality of distributed events; calculating an accumulated weighted sum of the distributed events from the event count component; determining an excess power consumption by comparing the accumulated weighted sum with a threshold power value; and adjusting power consumption of the respective processing core based on the determined excess power consumption. The threshold power value is selectable from one of a short-term power usage threshold or a long-term power usage threshold.

In some examples, the method includes simultaneously comparing the accumulated weighted sum with the short-term power usage threshold and comparing the accumulated weighted sum with the long-term power usage threshold. In some examples, the power consumption is adjusted by generating a power throttle control signal for the respective processing core with excess power consumption. In some examples, the distributed events are monitored on an execution unit of the respective processing core, and the power consumption is adjusted by performing power throttling for the execution unit of the respective processing core. In some examples, the distributed events are further monitored on a processor engine of the respective processing core using a plurality of event count components, and the power consumption is adjusted by performing power throttling for the processor engine. In such examples, the method further includes the steps of: determining an aggregated power consumption for the execution unit and the processor engine by aggregating the accumulated weighted sum from the plurality of event count components, and determining the excess power consumption by comparing the aggregated weighted sum with the threshold power value.

In some examples, the plurality of event count components in the execution unit and the processor engine are interconnectedly coupled via at least one ring bus. In some examples further to the above, the distributed events are further monitored on a cache memory shared by the processing cores using the event count components, and the power consumption is adjusted by performing power throttling for the shared cache memory. The method in such examples further include the steps of: determining a second aggregated power consumption for the execution units, the processor engines, and the shared cache memory by aggregating the aggregated power consumptions from all of the processing cores, and determining the excess power consumption by comparing the second aggregated weighted sum with the threshold power value.

In some examples, the plurality of event count components in the execution units, the processor engines, and the shared cache memory are interconnectedly coupled via a plurality of ring buses. In some examples, the method further includes the step of sending a power throttling signal to the respective processing core based on the determined excess power consumption. In some examples, the power throttling signal causes a reduction in instructions per cycle (IPC) of the respective processing core based on the excess power consumption of the respective processing core. In some examples, the power throttling signal is a pulse-width modulation (PWM) throttle signal sent to the respective processing core based on the excess power consumption of the respective processing core. In some examples, the execution unit is a floating point unit.

According to certain implementations, a processing system for controlling power consumption of at least one processing core includes at least one execution unit. The execution unit includes at least one first event count component and a first master accumulation component coupled with the first event count component. The first event count component monitors a plurality of distributed events in the execution unit, and calculates an accumulated weighted sum of the distributed events. The first master accumulation component determines an excess power consumption by comparing the accumulated weighted sum with a threshold power value, and adjusts power consumption of the execution unit based on the determined excess power consumption. The threshold power value selectable from one of a short-term power usage threshold or a long-term power usage threshold. The first master accumulation component includes a first logic component to compare the accumulated weighted sum with the short-term power usage threshold, and a second logic component to compare the accumulated weighted sum with the long-term power usage threshold.

In some examples, the first logic component compares the accumulated weighted sum with the short-term power usage threshold simultaneously as the second logic component compares the accumulated weighted sum with the long-term power usage threshold. In some examples, the processing system further includes a plurality of first event count components in the execution unit, and at least one ring bus operably coupled to the plurality of first event count components such that the plurality of first event count components are interconnected.

In some embodiments, the processing system further includes at least one processor engine coupled with the at least one execution unit. The processor engine includes a first slave interface operably coupled with the first master accumulation component, at least one second event count component, and a second master accumulation component. The first slave interface receives the accumulated weighted sum from the first master accumulation component. The second event count component receives from the first slave interface the accumulated weighted sum, monitors a plurality of distributed events in the processor engine, and calculates a second accumulated weighted sum of the distributed events including the accumulated weighted sum from the first master accumulation component. The second master accumulation component determines an aggregated power consumption for the execution unit and the engine based on the second accumulated weighted sum, determines the excess power consumption by comparing the aggregated power consumption with the threshold power value, and adjusts power consumption of the execution unit or the processor engine based on the determined excess power consumption. The second master accumulation component further includes a first logic component to compare the accumulated weighted sum with the short-term power usage threshold, and a second logic component to compare the accumulated weighted sum with the long-term power usage threshold.

In some examples, the processing system further includes a plurality of second event count components in the processor engine, and at least one ring bus operably coupled to the plurality of second event count components such that the plurality of second event count components are interconnected.

In some embodiments, the processing system further includes a plurality of processor engines and a cache memory coupled with the plurality of processor engines. The cache memory includes a second slave interface operably coupled with the second master accumulation component, at least one third event count component, and a third master accumulation component. The second slave interface receives the aggregated power consumption from the second master accumulation component. The third event count component receives from the second slave interface the aggregated power consumption, monitors a plurality of distributed events in the cache memory, and calculates a third accumulated weighted sum of the distributed events including the accumulated weighted sum from the first master accumulation component and the aggregated power consumption from the second master accumulation component. The third master accumulation component determines a second aggregated power consumption for the cache memory based on the third accumulated weighted sum, determines the excess power consumption by comparing the second aggregated power consumption with the threshold power value, and adjusts power consumption of the execution unit, the processor engine, or the cache memory based on the determined excess power consumption. The third master accumulation component further includes a first logic component to compare the accumulated weighted sum with the short-term power usage threshold, and a second logic component to compare the accumulated weighted sum with the long-term power usage threshold.

In some examples, the processing system further includes an arbiter coupled with the third master accumulation component. The arbiter is configured to send a power throttling signal to one or more of the at least one execution unit, the at least one processor engine, or the cache memory based on the determined excess power consumption.

In some examples, the power throttling signal causes a reduction in instructions per cycle (IPC) of the one or more of the at least one execution unit, the at least one processor engine, or the cache memory based on the excess power consumption therein. In some examples, the power throttling signal is a pulse-width modulation (PWM) throttle signal sent to the one or more of the at least one execution unit, the at least one processor engine, or the cache memory based on the excess power consumption therein. In some examples, the execution unit is a floating point unit.

According to certain implementations, a memory controller operatively coupled with a cache memory configured to be shared by a plurality of processing cores may be configured to perform the process disclosed herein, where each processing core includes an execution unit and a processor engine. That is, the memory controller causes each of the processing cores to: monitor a plurality of distributed events in the execution unit and calculate an accumulated weighted sum of the distributed events using at least one first event count component, and determine an excess power consumption by comparing the accumulated weighted sum with a threshold power value and adjusts power consumption of the execution unit based on the determined excess power consumption using a first master accumulation component. The threshold power value selectable from one of a short-term power usage threshold or a long-term power usage threshold.

In some examples, the memory controller causes respective processing core to simultaneously compare the accumulated weighted sum with the short-term power usage threshold and compare the accumulated weighted sum with the long-term power usage threshold. In some examples, the memory controller further cause the each of the processing cores to: receive the accumulated weighted sum from the first master accumulation component using a first slave interface operably coupled with the first master accumulation component, receive from the first slave interface the accumulated weighted sum, monitor a plurality of distributed events in the processor engine, and calculate a second accumulated weighted sum of the distributed events including the accumulated weighted sum from the first master accumulation component using at least one second event count component, and determine an aggregated power consumption for the execution unit and the engine based on the second accumulated weighted sum, determine the excess power consumption by comparing the aggregated power consumption with the threshold power value, and adjusts power consumption of the execution unit or the processor engine based on the determined excess power consumption using a second master accumulation component.

In some examples, the memory controller further receives the aggregated power consumption from the second master accumulation component using a second slave interface operably coupled with the second master accumulation component; receives from the second slave interface the aggregated power consumption, monitor a plurality of distributed events in the cache memory, and calculate a third accumulated weighted sum of the distributed events including the accumulated weighted sum from the first master accumulation component and the aggregated power consumption from the second master accumulation component using at least one third event count component; and determines a second aggregated power consumption for the cache memory based on the third accumulated weighted sum, determine the excess power consumption by comparing the second aggregated power consumption with the threshold power value, and adjusts power consumption of the execution unit, the processor engine, or the cache memory based on the determined excess power consumption using a third master accumulation component.

In some examples, the memory controller further causes an arbiter coupled with the third master accumulation component to receive the determined excess power consumption and send a power throttling signal to one or more of the at least one execution unit, the at least one processor engine, or the cache memory based on the determined excess power consumption. In some examples, the power throttling signal may be an instructions per cycle (IPC) reduction signal of the one or more of the at least one execution unit, the at least one processor engine, or the cache memory based on the excess power consumption therein. In some examples, the power throttling signal may be a pulse-width modulation (PWM) throttle signal sent to the one or more of the at least one execution unit, the at least one processor engine, or the cache memory based on the excess power consumption therein.

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Figure 1:
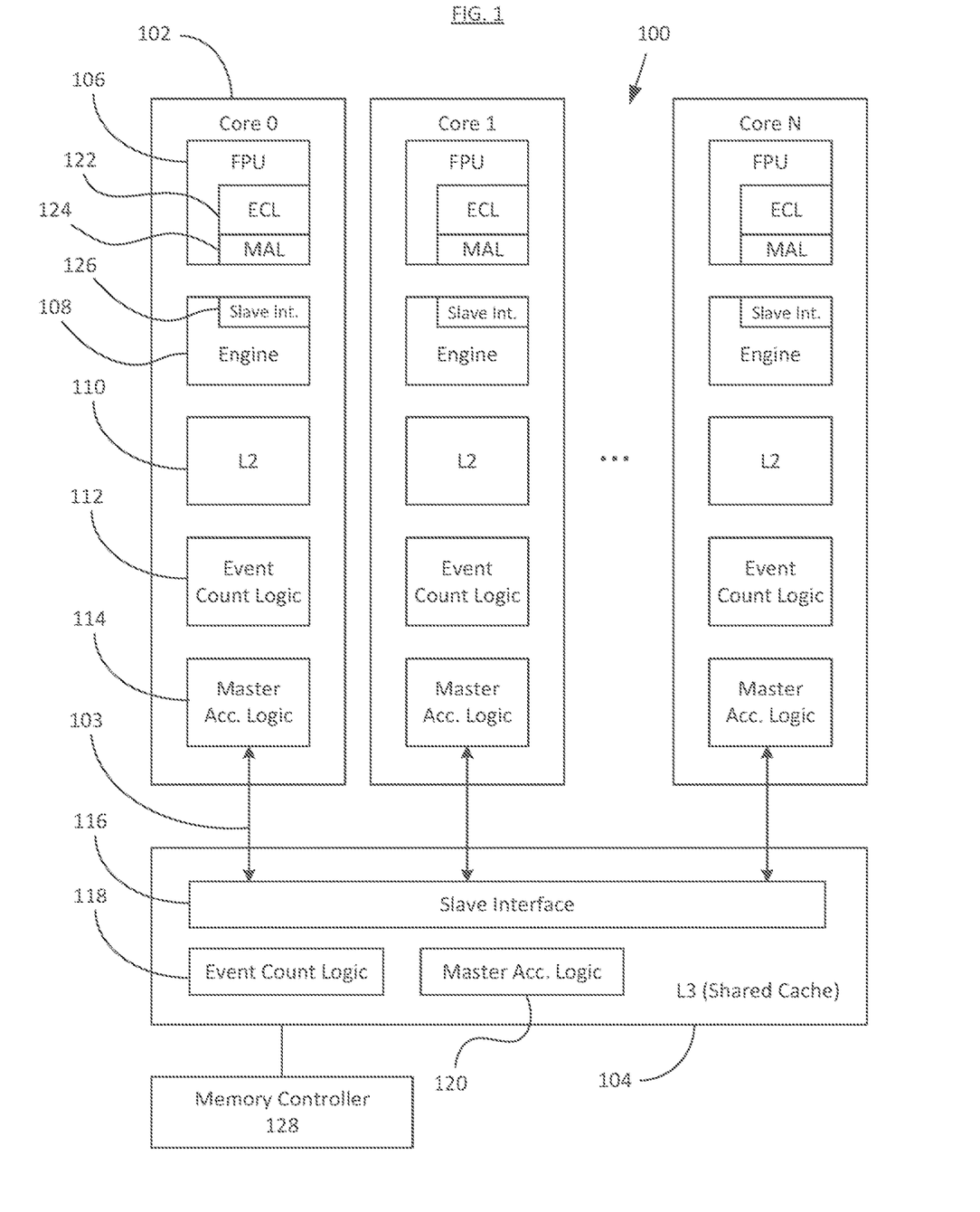
FIG. 1 is an example functional block diagram of a multi-processor core system according to embodiments disclosed herein.

FIG. 1 illustrates a high-level view of an exemplary multi-processor core system 100 according to embodiments disclosed herein. The system 100 includes a plurality of N+1 cores (from core 0 to core N) that are each coupled with a shared cache memory 104 such as L3 cache via a data communication bus 103 such as a system bus to transmit information to and from the cores 102 and the shared cache 104. The cores 102 and the shared cache 104 are disposed on a common die with a clock and an interface for connection to a northbridge (not shown). The northbridge may include a memory controller 128 that may be implemented in any suitable manner such as one or more state machines, a programmable processor and/or a combination of processor executing software instructions and one or more state machines.

Each core 102 includes an execution unit 106 which may be a floating point unit as shown or any other suitable type of execution unit. The core 102 also includes an engine 108, cache memory 110 such as L2 cache, an event count logic component 112, and a master accumulation logic component 114. The shared cache 104 includes a slave interface 116 that is coupled with each of the master accumulation logic components 114 in the cores 102, as well as its own event count logic component 118 and master accumulation logic component 120. Furthermore, each execution unit 106 includes its own event count logic component 122 and master accumulation logic component 124. The engine 108 also has its own slave interface 126 that is coupled to the master accumulation logic component 124 of the execution unit 106.

Each of the aforementioned logic components (that is, the event count logic components and the master accumulation logic components) as well as the slave interfaces may be implemented using one or more digital circuit components including but not limited to logic units such as arithmetic logic units (ALU), multiplexers (MUX), registers, control units, etc., according to their functionalities. Such components may be collectively referred to as digital power monitor (DPM). The engine 108 is a processing engine with components including but not limited to a decoder, a branch predictor, an instruction unit, a load-store unit, an integer execution unit, etc., excluding the execution unit 106, which in the example shown is a floating point unit.

Figure 2:
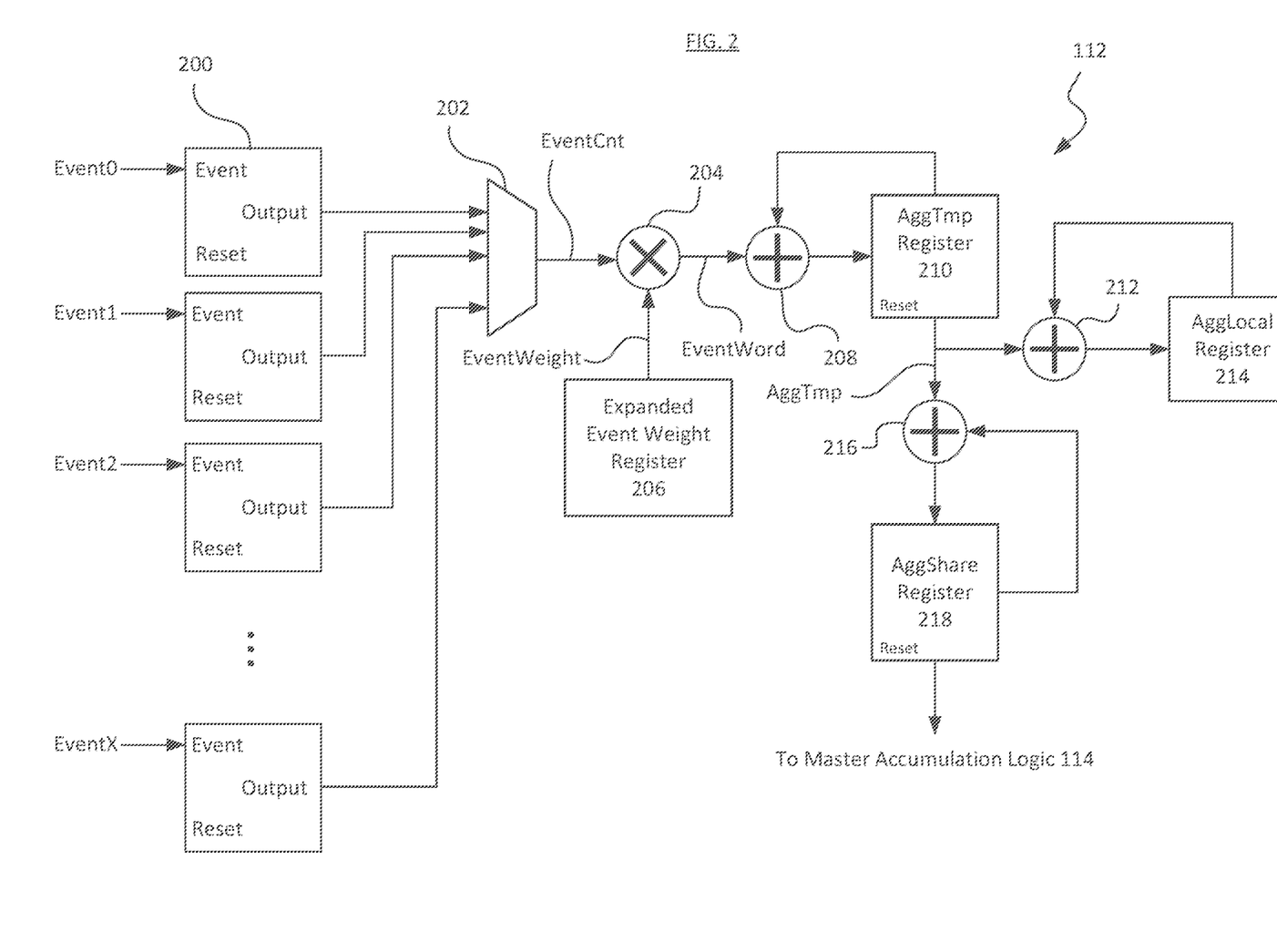
FIG. 2 is an example functional block diagram of the subcomponents of an event count logic component implemented in the system of FIG. 1 according to embodiments disclosed herein.

FIG. 2 illustrates a high-level view of the subcomponents of an exemplary event count logic component, for example the event count logic component 112 for the core 102, as well as how the event count logic component operates, according to embodiments disclosed herein. The event count logic component 112 includes a plurality of event detectors 200, where each event detector is capable of detecting the occurrence of a distributed event and maintains count of its occurrence in a register, as shown. The input receives an event (in the example shown, there are X+1 events that may be detected, that is, Event0 through EventX) and the counter within the event detector 200 maintains count of the event until the event count is transferred to the next subcomponent of the event count logic component 112, which is a scaler 204.

Some of the events that are monitored may include, for example: predicting the outcome of a branch instruction; accessing instruction data in an instruction cache; accessing instruction data in an "op cache"; dispatching an operation from an instruction decode unit to an integer execution unit; selecting a ready floating-point operation to be executed; selecting a ready integer ALU operation to be executed; selecting a ready load or store operation to be executed; training a cache prefetch mechanism; reading or writing from an L2 cache memory; reading or writing from an L3 cache memory; or reading or writing from external memory, among others.

The scaler 204 receives the event count (EventCnt) from one of the event detectors 200 as selected by a MUX 202. The selected event count (EventCnt) is scaled or multiplied using an expanded event weight (EventWeight) as selected from an expanded event weight register 206 that corresponds to the selected type of event. The bits in the scaled event (EventWord) are sent to an adder 208 to be added to the corresponding bits in a temporary aggregated register (AggTmp) 210 and stored therein. The stored bits within the AggTmp register 210 are then sent to a local aggregated register (AggLocal) 214 as well as a shared aggregated register (AggShare) 218. The bits from the AggTmp register 210 are added to the corresponding bits in the AggLocal register 214 via an adder 212, and also added to the corresponding bits in the AggShare register 218 via an adder 216.

In some examples, the AggLocal register 214 stores a growing sum of local events such that it may be referred to when performing power consumption analysis, for example, in order to determine how each of the events affect the power consumption of the cores, among other types of analysis as suitable. The AggShare register 218 stores the aggregated value of all the events' weighted power consumption (referred to as "Cac" or dynamic capacitance). The aggregated value is also referred as an accumulated weight sum of all the events. The AggShare register 218 is capable of communicating with the master accumulation logic component 114 such that the accumulated weighted sum from the event count logic component 112 may be sent to be compared with the appropriate threshold values.

Each core 102 has its own set of event count logic components 112 and master accumulation logic component 114, and the master accumulation logic component 114 is capable of receiving the accumulated weighted sum from each of the event count logic components 112 and aggregate the weighted sums into a single value to be compared with a threshold in order to determine whether the total value of the weighted sums is over the threshold, and if so, by how much. The threshold may be determined based on the thermal design current (TDC) and the electrical design current (EDC) of the cores. The total of the weight sums indicates the total Cac estimation for the event. In some examples, the values of the AggShare register 218 are transferred serially to the master accumulation logic component 114, and as soon as a bit is transferred, the register clears the transferred bit one at a time to reset itself such that the accumulated weight sum of the next set of events may be stored therein.

Figure 3:
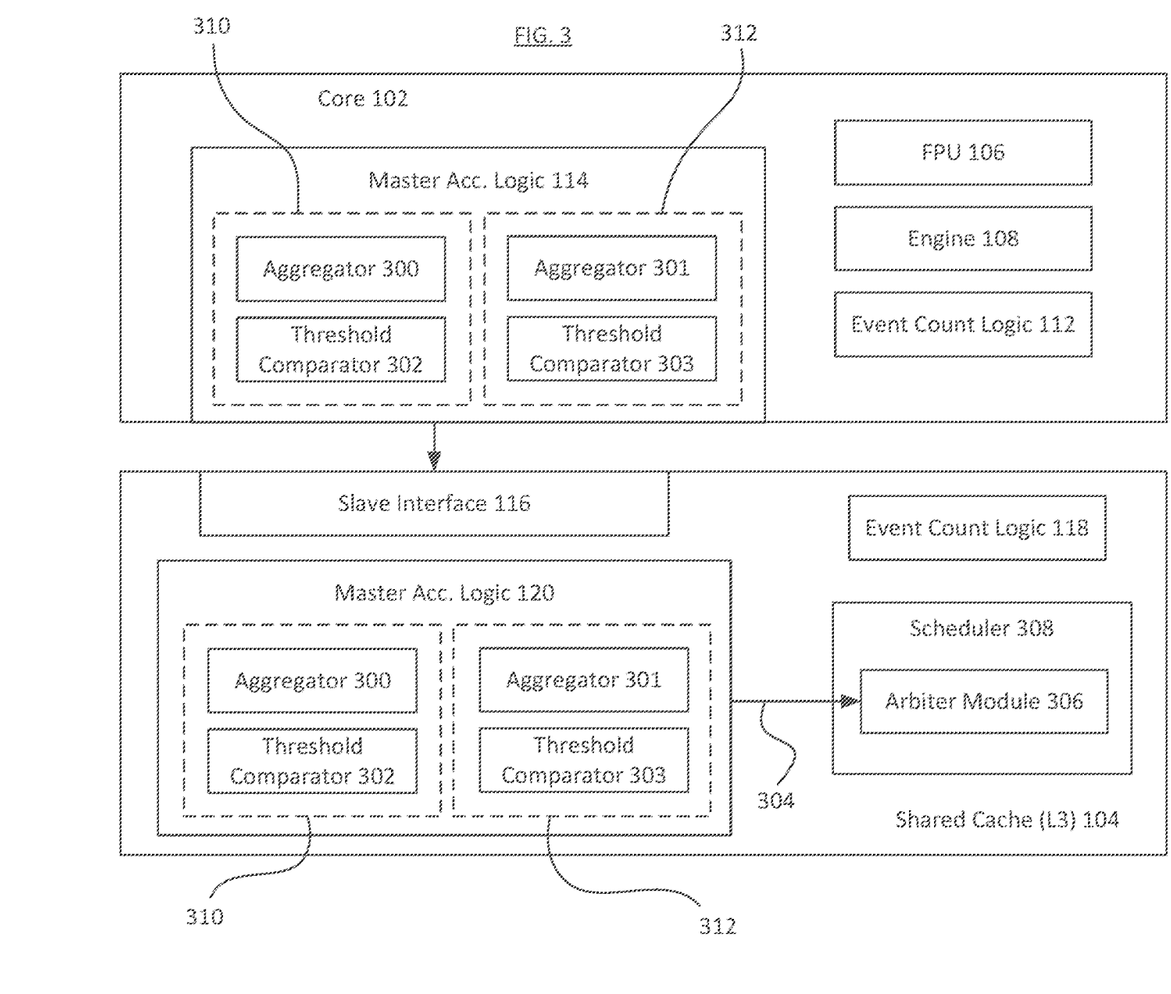
FIG. 3 is an example functional block diagram of the subcomponents of a core and a shared (L3) cache implemented in the system of FIG. 1 according to embodiments disclosed herein.

FIG. 3 illustrates a high-level view of the subcomponents of exemplary core and shared cache memory, for example the core 102 and shared cache memory 104 coupled therewith, according to some embodiments. The cache memory 104 includes the slave interface 116 which is coupled with the cores 102 via the master accumulation logic component 114, as well as its own master accumulation logic component 120. In each of these master accumulation logic components 114 and 120, there is an aggregator module 300 which aggregates all the weighted sums from each of the individual AggShare registers 218 in the event count logic components 112 (in the core 102) or 118 (in the shared cache 104) and a threshold comparator module 302 which compares the aggregated weighted sums with a threshold to determine if the event exceeds the Cac estimation threshold (that is, in the state of OverThresh), and if so, by how much it exceeds the budget (that is, the amount of OverBudget).

In some examples, the master accumulator logic component 120 is coupled with a scheduler 308 with an arbiter module 306 such that the OverThresh and OverBudget signals are sent to the arbiter module 306 in the form of a throttle signal 304 that is generated by the master accumulation logic component 120 based on the results of the threshold comparator module 302. The throttle signal 304 is a signal sent to the arbiter module 306 in facilitate power throttling such as PWM throttling or a reduction in IPC in the component that is determined to be at the OverThresh state, that is, the events therein exceed the Cac estimation threshold. In some examples, alternative methods of adjusting or modifying power consumption of the respective processor core or the shared memory may involve clock stretching or operating frequency reduction, as suitable. As such, the power throttling facilitates adjustment or modification of the Cac estimation in order to bring the power consumption to below the threshold value through any suitable means, including but not limited to PWM throttling or IPC reduction.

Furthermore, each of the master accumulation logic components 114 and 120 includes separate accumulators for short-term and long-term power usage decisions. Each of the separate accumulators may include any suitable components such as logic units including but not limited to ALU, MUX, registers, control units, counters, etc., for example, to facilitate comparing the collected power usage data to the appropriate power usage threshold. For example, the aggregator 300 and the threshold comparator 302 may be implemented as part of a first logic component or a short-term accumulator 310 which facilitates power throttling with a very short time interval (for example, once per each accumulation packet cycle) associated with the EDC-based threshold, hereinafter referred to as the "EDC threshold". Additionally, a second logic component or a long-term accumulator 312 is included in the master accumulation logic component to facilitate power throttling with a longer time interval associated with the TDC-based threshold, hereinafter referred to as the "TDC threshold".

That is, the long-term accumulator 312 includes an aggregator 301 and a threshold comparator 303 which operates similar to the aggregator 300 and the threshold comparator 302, respectively, but instead of collecting short-term power usage data and comparing it to the EDC threshold, these components allow for periodically collecting the long-term power usage data (lasting a plurality of accumulation packet cycles), comparing the collected power usage data to the TDC threshold, and managing the voltage and frequency levels of the core(s) 102, and in some cases also the shared cache memory 104, that exceed the TDC threshold, such that the system 100 remains within the limit set forth by the TDC threshold. As such, each of the master accumulation logic components is capable of performing power throttling based on both the short-term EDC threshold and the long-term TDC threshold.

In some examples, the separate accumulators 310 and 312 are capable of simultaneously comparing the collected short-term or long-term power usage data to the EDC threshold or the TDC threshold, respectively, such that the appropriate power throttling may be performed. In some examples, the accumulators 310 and 312 are operable independently of each other, such that either the short-term (or EDC) threshold comparison or the long-term (or TDC) threshold comparison may be selected to be performed by the appropriate accumulator.

As explained above, one of the methods of performing power throttling includes reducing the IPC, for example. Reducing the IPC may be done by reducing the allowed bandwidth for branch prediction, instruction fetch, instruction decode, or instruction execution, for example. Power throttling may also be performed by reducing processor frequency by various means, including reducing phase-locked loop (PLL) or delay-locked loop (DLL) frequency or using a digital frequency divider, for example. Power throttling may also be performed by reducing power supply voltage either at a shared voltage regulator or at a voltage regulator local to a specific component, such as a processor core or cache memory, for example.

Each of the master accumulator logic components 114, 120, and 124 are arranged hierarchically, that is, the result of the threshold comparator 302 therein facilitates PWM throttling of the component of equal or lower hierarchy. For example, the master accumulation logic component 120 associated with the shared cache memory 104 is of the highest hierarchy because the throttling signal 304 affects the shared cache memory 104 and the core 102, which is of lower hierarchy than the shared cache memory 104. Similarly, the result of the threshold comparator 302 in the master accumulation logic component 114 associated with the core 102 affects the operation of the engine 108 and the FPU 106, which is of lower hierarchy than the engine 108. Lastly, the result of the threshold comparator 302 in the master accumulation logic component 124 associated with the FPU 106 affects only the operation of the FPU 106, which may be of the lowest hierarchy of these components in some examples. In some examples, there may be any arbitrary number of additional levels of hierarchy that are supported by the system.

Figure 4:
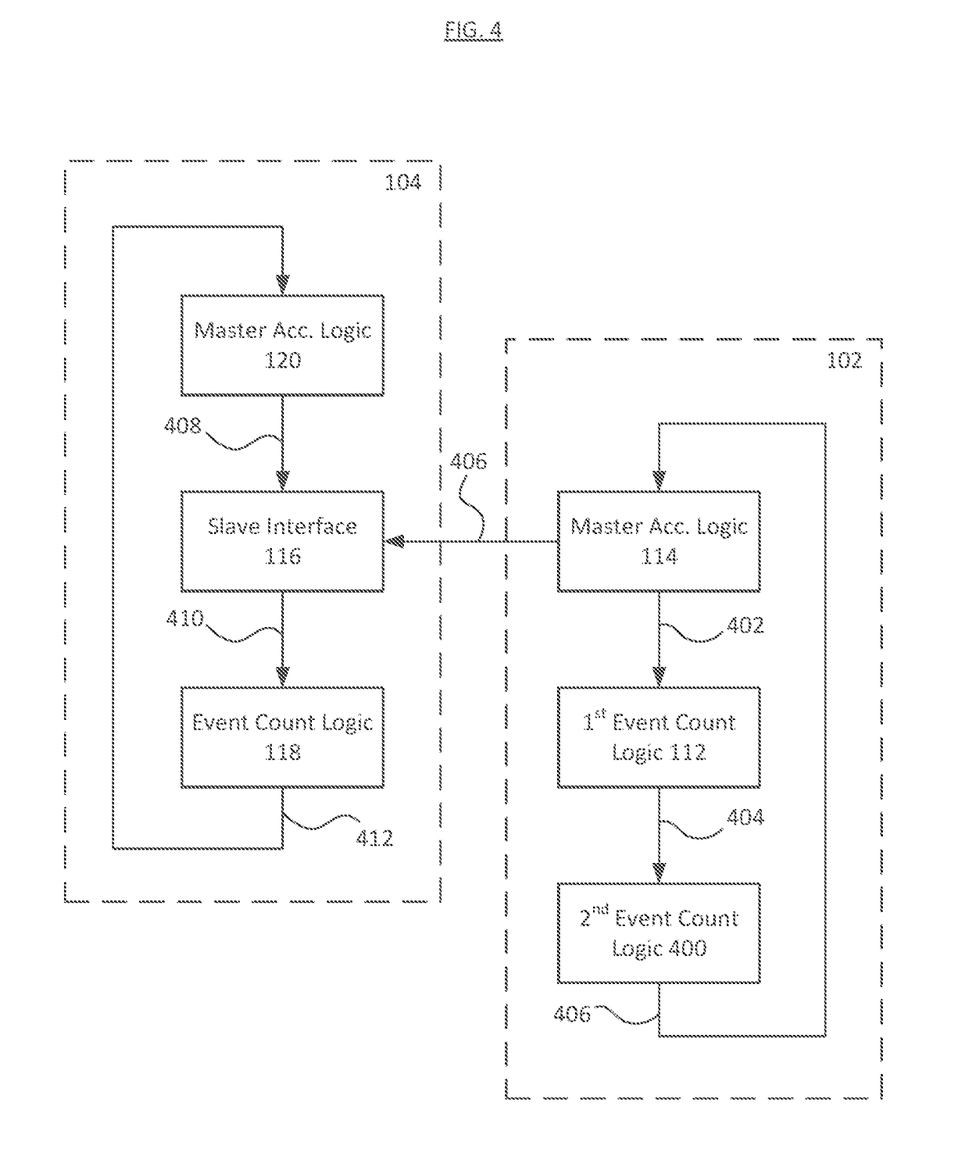
FIG. 4 is an example functional block diagram of data flow from the core to the shared cache in the system of FIG. 1 according to embodiments disclosed herein.

FIG. 4 illustrates a high-level view of how the weighted sums of events are accumulated within the core 102 and how they are aggregated with those accumulated within the shared cache memory 104, according to embodiments disclosed herein. As illustrated, the core 102 has a plurality of event count logic components 112 and 400 such that each event count logic component may be capable of counting a different type of event within the core 102. The master accumulation logic component 114 of the core 102 begins the process by sending an initial aggregation packet 402 to the first event count logic component 112, which may be an empty packet to be filled by the corresponding event count logic components within the core 102. In some examples, the initial aggregation packet is issued at equal time interval such as approximately 50 ns, and new packets may not be issued until the previous aggregation packet is completely sent but not necessarily received.

The first event count logic component 112 accumulates the initial aggregation packet 402 with the value of the weighted sum from its AggShare register 218 to generate aggregation packet 404. The first event count logic component 112 sends the aggregation packet 404 to the second event count logic component 400 such that the second event count logic component 400 then accumulates the received aggregation packet 404 with the value of the weighted sum (that is, the accumulated Cac) from its AggShare register 218 to generate aggregation packet 406, which is sent back to the master accumulation logic component 114. Although only two event count logic components are shown, it is to be understood that any suitable number of event count logic components may be employed.

The aggregation packet 406 represents the total accumulated Cac from all the event count logic components in the core 102. After the master accumulation logic component 114 receives the aggregation packet 406 which includes the weighted sums from all the event count logic components associated with the core 102, the aggregation packet 406 may be then transferred to a slave interface, if present. In this instance, the slave interface 116 of the shared cache memory 104 receives the aggregation packet 406 from the core 102. In some examples, the master accumulation logic component 114 may compare the aggregation packet 406 to a threshold value to determine whether the events local to core 102 cause an OverThresh state local to the core 102.

In the shared cache memory 104, the master accumulation logic component 120 sends an initial aggregation packet 408, similar to the initial aggregation packet 402 in the core 102. The slave interface 116 aggregates the initial aggregation packet 408 with the aggregation packet 406 received from the master accumulation logic component 114 of the core 102 to generate an aggregation packet 410 which in effect is identical to the aggregation packet 406 if the initial aggregation packet 408 is empty. Subsequently, one or more event count logic component 118 associated with the shared cache memory 104 accumulates the aggregation packet 412 with the value of the weighted sum from its AggShare register 218 to generate a total aggregation packet 412, which is the final aggregation packet that aggregates the weighted sum of events from not only the event count logic components associated with the cores 102 but also those associated with the shared cache memory 104. The master accumulation logic component 120 receives the total aggregation packet 412 and compares the results to the threshold value to determine whether the events cause the OverThresh state in the components, as described.

As shown in FIG. 4, the event count logic components, the master accumulation logic component, and the slave interface, if applicable, may be interconnected using serial buses or ring buses such that the aggregation packet are transferred from one component to the next in the aggregation process. The transfer of data is performed in a hierarchical manner as defined by the slave interfaces; that is, the slave interfaces ensure the unidirectional data flow from the master accumulation logic component to the slave interface during the aggregation process. The hierarchy of the master accumulation logic components may be ascertained in the following order: (1) Cac of the events in each core's execution unit, (2) Cac of the events in each core and in all the execution units therein, (3) Cac of the shared cache memory associated with the cores, and (4) Cac of all the cores and the shared cache memory associated with the cores.

Figure 5:
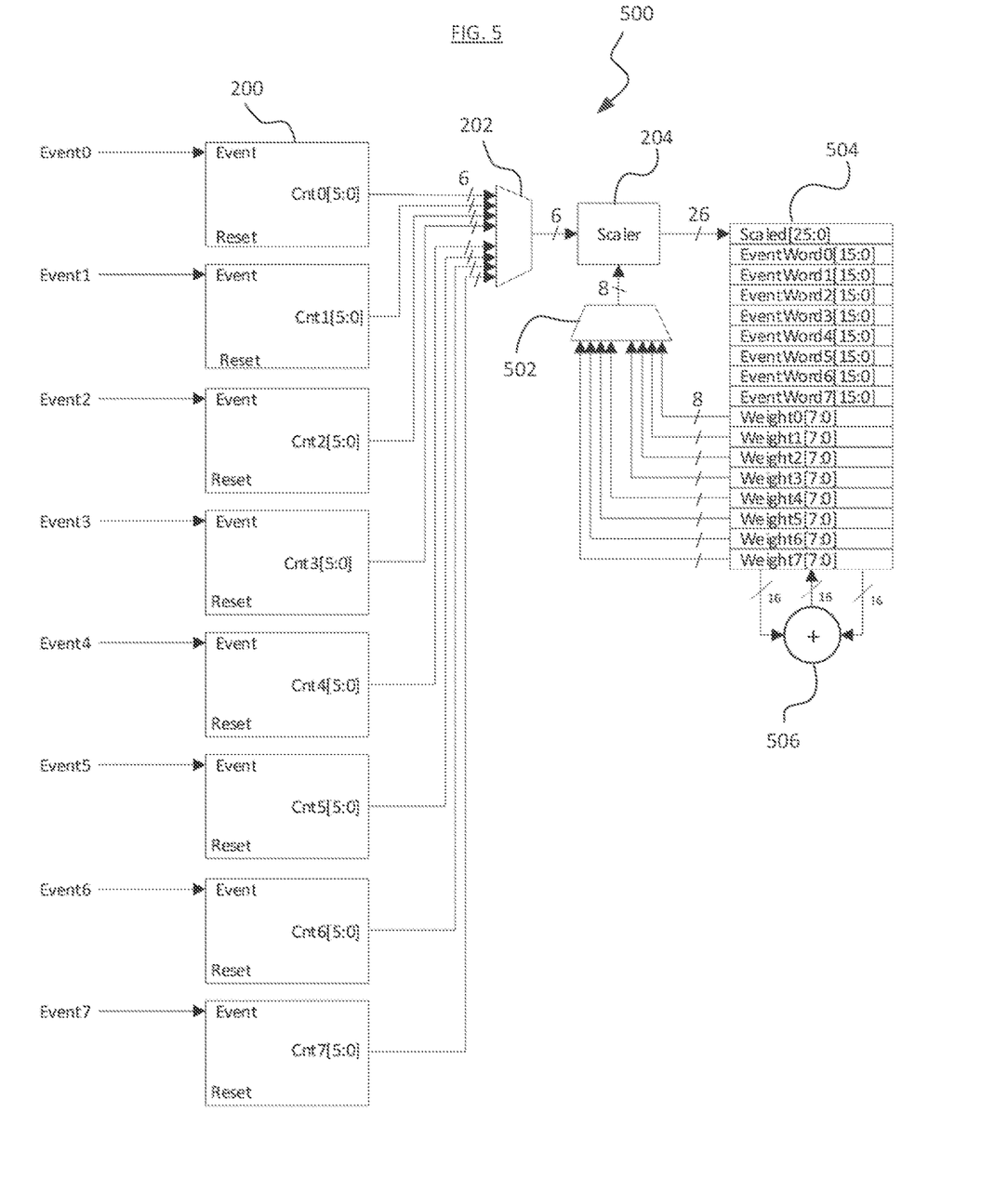
FIG. 5 is an example functional block diagram of the subcomponents of the event count logic component from FIG. 2 according to embodiments disclosed herein.

FIG. 5 shows an event count logic component 500 in one example of implementation, according to embodiments disclosed herein. The event count logic component 500 may represent any one of the event count logic components in the execution unit, core, or shared cache memory, and uses portions of an associated register 504 to perform the calculations and store the results thereof as shown in FIG. 2.

The event count logic component 500 includes a plurality of event detectors 200 to detect the same number of events, or more specifically eight (8) events, Event0 through Event7. The output of each event detector 200 is a 6-bit event counter string (one of Cnt0[5:0] through Cnt7[5:0]) which is sent to the MUX 202 to be selected. Once selected, the 6-bit event counter is multiplied with a selected 8-bit weight string by the scaler 204, where the weight string (one of Weight0[7:0] through Weight7[7:0]) is selected by a MUX 502 according to the selected event counter.

Once scaled, the scaler 204 outputs a 26-bit scaled data string to be accumulated and stored in the register 504. Specifically, each of the subsections EventWord0[15:0] through EventWord7[15:0] of the register 504 operates as a portion of the registers 210, 214, and 218 shown in FIG. 2. That is, in this example, EventWord0[15:0] through EventWord2[15:0] are collectively used as a 48-bit AggShare register 218, EventWord3 [15:0] and EventWord4[15:0] are collectively used as a 32-bit AggTmp register 210, and EventWord5[15:0] through EventWord7[15:0] are collectively used as a 48-bit AggLocal register 214. An adder 506 collectively operates as the adders 208, 212, and 216 in order to calculate the weighted sums from the plurality of events and store the results in the corresponding subsections of the register 504.

The system 100 may be any type of processor system such as a central processing unit (CPU) or a graphics processing unit (GPU). For example, the system 100 may be implemented as an x86 processor with x86 64-bit instruction set architecture and is used in desktops, laptops, servers, and superscalar computers; an Advanced Reduced Instruction Set Computer (RISC) Machine (ARM) processor that is used in mobile phones or digital media players; or a digital signal processor (DSP) that is useful in the processing and implementation of algorithms related to digital signals, such as voice data and communication signals, and microcontrollers that are useful in consumer applications, such as printers and copy machines.

The cores 102 form the computational centers of the system 100 and are responsible for performing a multitude of computational tasks. For example, the processor cores 102 may include, but are not limited to, execution units that perform additions, subtractions, shifting and rotating of binary digits, and address generation and load and store units that perform address calculations for memory addresses and the loading and storing of data from memory. The operations performed by the processor cores 102 enable the running of computer applications.

The processor cores 102 operate according to certain performance states (P-states), for example as controlled by the controller 128. P-states are described as follows. The Advanced Configuration and Power Interface (ACPI) standard is an operating system-based specification that regulates a computer system's power management. For example, the ACPI standard may control and direct the processor cores for better management of battery life. In doing so, ACPI assigns processor power states, referred to as C-states, and forces a processor to operate within the limits of these states. There are varying levels of C-states (e.g., C0 for a fully working state, with full power consumption and full dissipation of energy; C1 for a sleeping state, where execution of instructions are stopped and the processor may return to execute instructions instantaneously; or C2 for another sleeping state where the processor may take longer to go back to C0 state) that a processor may be assigned, along with the corresponding implication for a processor's performance.

While a processor is in the fully working C0 state, it will be associated with another state, referred to as the performance state or the P-state. There are varying levels of P-states that are each associated with an operating voltage and frequency. The highest performance state is P0, which may correspond to maximum operating power, voltage and frequency. However, a processor may be placed in lower performance states, for example P1 or P2, which correspond to lower operating power, voltage and/or frequency. Generally, when a processor moves to a lower P-state it will operate at a lower capacity than before.

Figure 6:
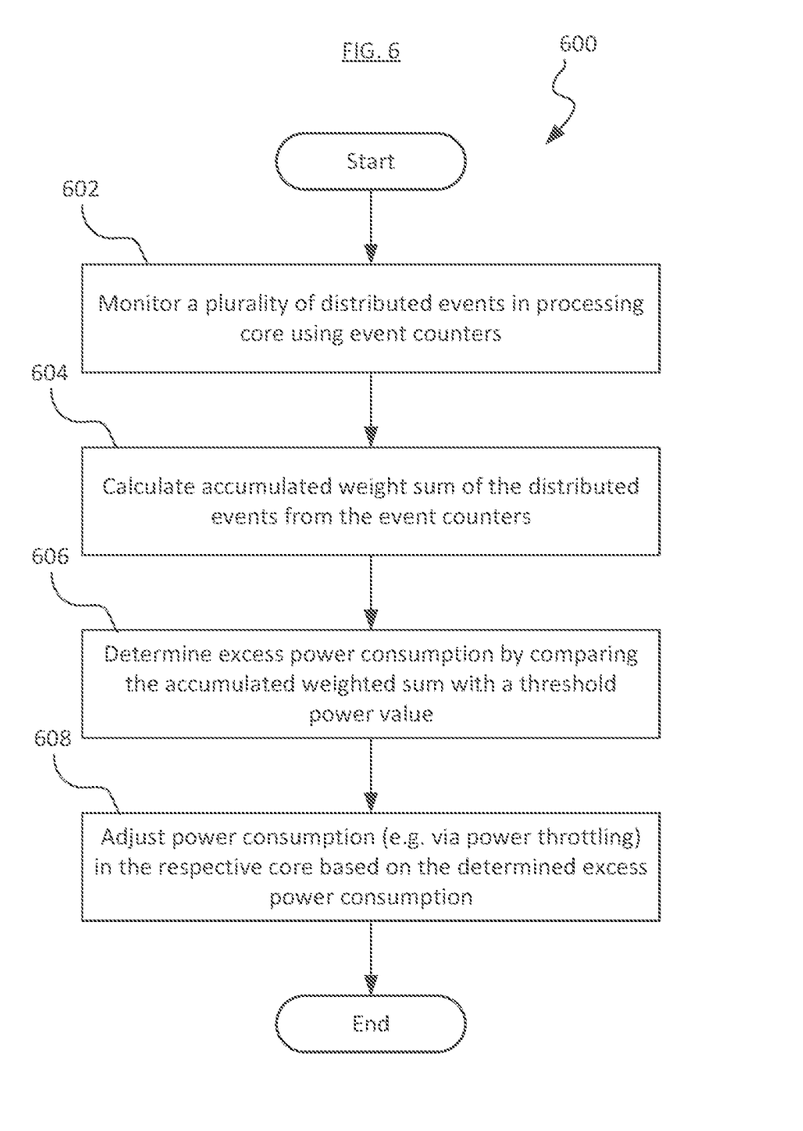
FIG. 6 is an example flow diagram of a process implemented in the system according to embodiments disclosed herein.

FIG. 6 is a flow diagram of an exemplary process 600 according to embodiments disclosed herein. This process, as well as any other process disclosed herein, may be performed by any suitable means such as one or more state machines, a programmable processor and/or a combination of processor executing software instructions and one or more state machines. In step 602, a plurality of distributed events are monitored in the respective processing core using event counters. In step 604, an accumulated weighted sum of the distributed events from the event counters is calculated. In step 606, the excess power consumption is determined by comparing the accumulated weighted sum with a threshold power value. In step 608, the power consumption of the respective processing core is adjusted or modified (e.g., reduced) based on the determined excess power consumption. In some examples, the power consumption is adjusted via power throttling.

In some examples, the distributed events may be monitored on an execution unit of the respective processing core, and adjusting the power consumption includes performing power throttling for the execution unit of the respective processing core. The method 600 is applicable for the distributed events that are monitored in any of the execution unit, the processing engine of the core, or the shared cache memory. As such, the distributed events in some examples include those only detected in the execution unit, those detected in the execution unit and the processing engine of the core, or those detected in the execution unit, processing engine, and the shared cache memory.

Figure 7:
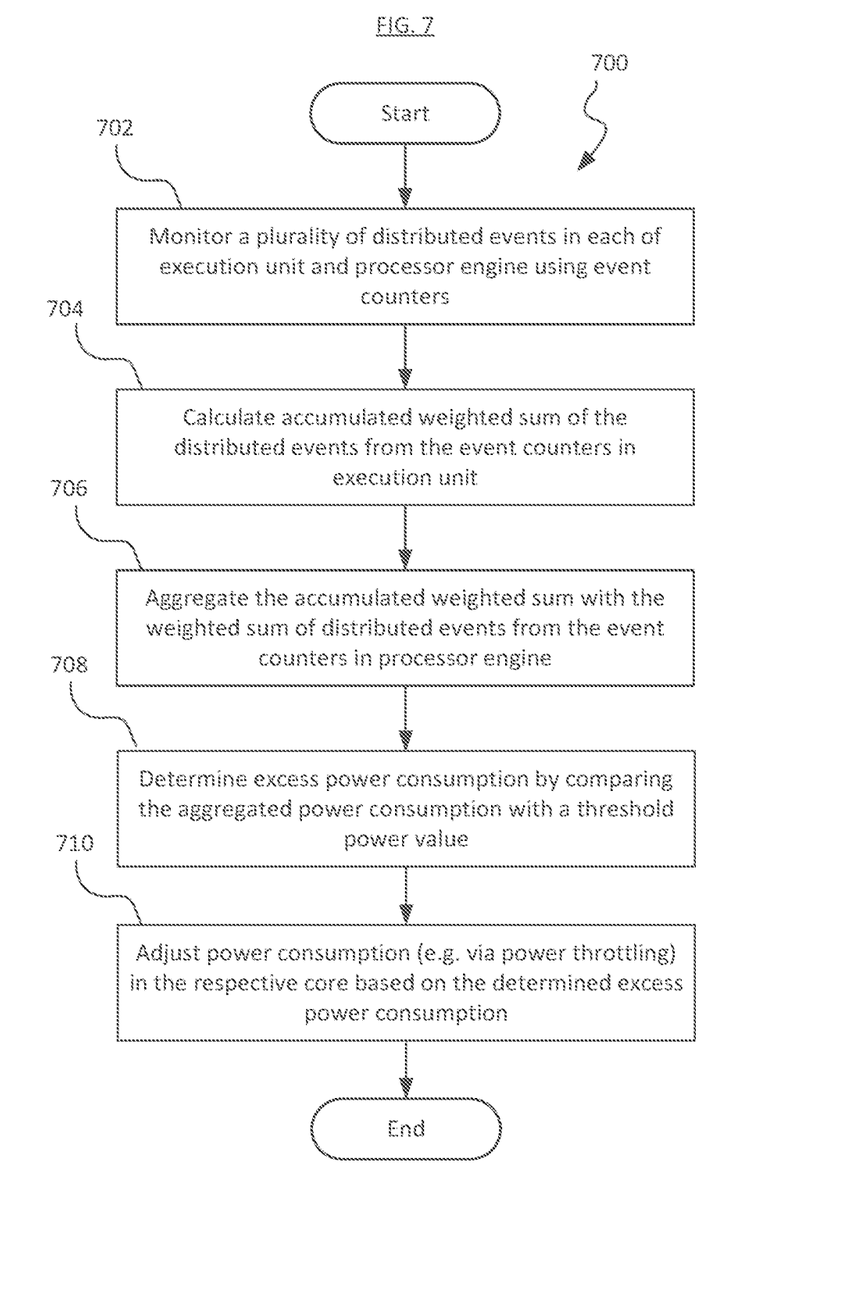
FIG. 7 is an example flow diagram of a process involving weighted sum accumulation corresponding to the execution unit and the processor engine as implemented in the system according to embodiments disclosed herein.

FIG. 7 is a flow diagram of an exemplary process 700, according to embodiments disclosed herein. The process 700 facilitates aggregating the power consumption estimation values of a plurality of distributed events in the execution unit and the processor engine, both of which are implemented as part of the processor core. In step 702, a plurality of distributed events are monitored in each execution unit and processor engine using event counters. The monitoring of distributed events may be performed separately or simultaneously in each of the cores. In step 704, the weighted sum of the distributed events from each of the event counters corresponding to the execution unit is accumulated to calculate an accumulated weighted sum for the events corresponding to the execution unit.

In step 706, the accumulated weighted sum from step 704 corresponding to the execution unit is aggregated with the weighted sum of the distributed events from the event counters corresponding to the processor engine. The aggregation may be performed by receiving via the slave interface of the processor engine the accumulated weighted sum from the master accumulation logic component of the execution unit and further accumulating the same with the weighted sum of the distributed events from the event counters corresponding to the processor engine.

In step 708, the excess power consumption of the execution unit and the processor engine is determined by comparing the aggregated power consumption with a threshold power value. In step 710, the power consumption of the respective processing core is adjusted based on the determined excess power consumption. In some examples, the power consumption is adjusted via power throttling. Specifically, the amount of power throttling may be proportional to the amount of excess power consumption by the execution unit and processor engine. The plurality of event count components in the execution unit and the processor engine may be interconnectedly coupled via at least one ring bus.

Figure 8:
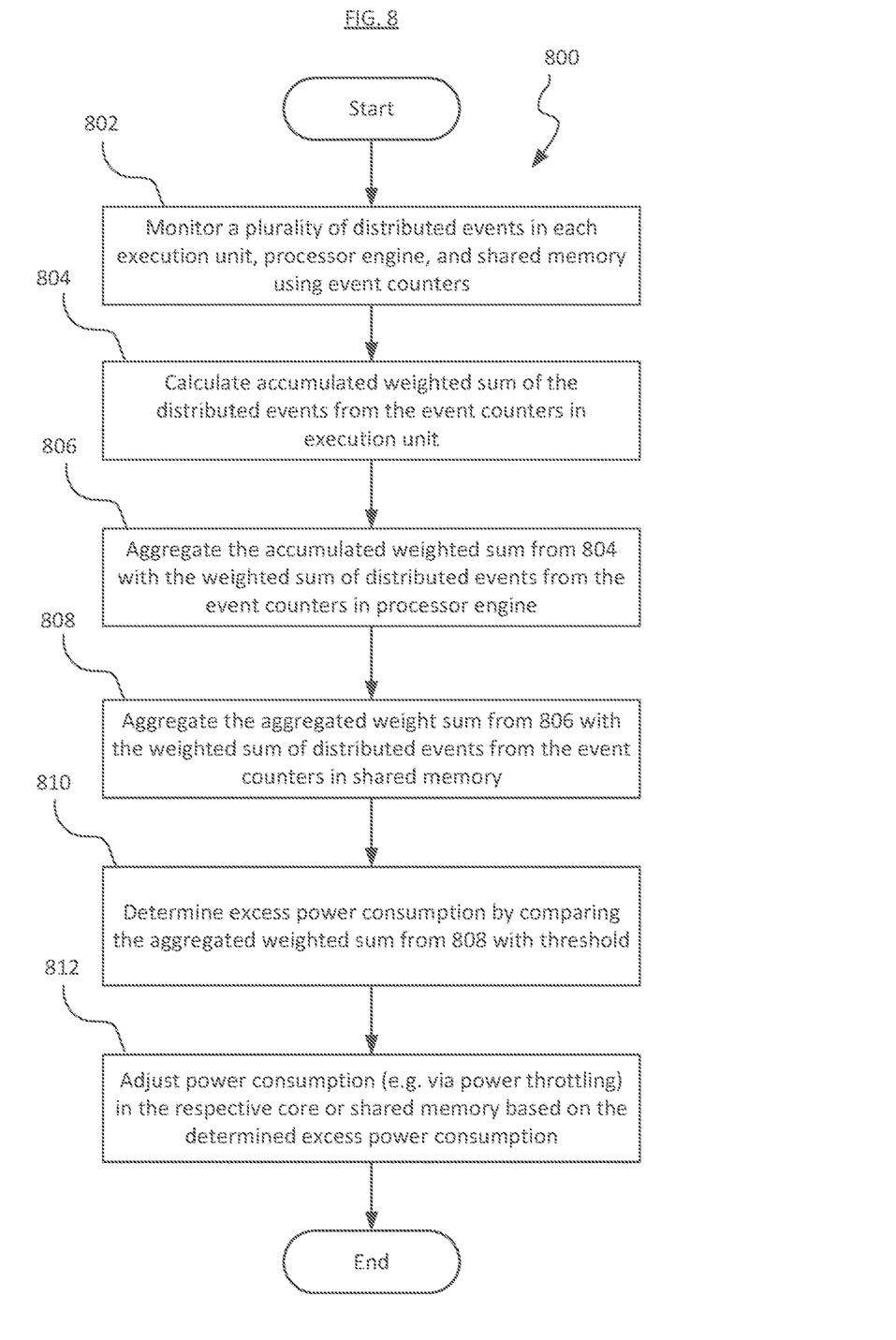
FIG. 8 is an example flow diagram of a process involving weighted sum accumulation corresponding to the execution unit, the processor engine, and the shared memory as implemented in the system according to embodiments disclosed herein.

FIG. 8 is a flow diagram of an exemplary process 800, according to embodiments disclosed herein. The process 800 facilitates aggregating the power consumption estimation values of a plurality of distributed events in the execution unit, the processor engine, and the shared cache memory that is operably coupled with the processor core implementing the execution unit and the processor engine.

In step 802, the plurality of distributed events in each of the execution unit, processor engine, and shared memory are monitored using event counters corresponding to these components. In step 804, the weighted sum of the distributed events from each of the event counters corresponding to the execution unit is accumulated to calculate an accumulated weighted sum for the events corresponding to the execution unit.

In step 806, the accumulated weighted sum from step 804 corresponding to the execution unit is aggregated with the weighted sum of the distributed events from the event counters corresponding to the processor engine. The aggregation may be performed by receiving via the slave interface of the processor engine the accumulated weighted sum from the master accumulation logic component of the execution unit and further accumulating the same with the weighted sum of the distributed events from the event counters corresponding to the processor engine.

In step 808, the accumulated weighted sum from step 806 corresponding to the execution unit and the processor engine is aggregated with the weighted sum of the distributed events from the event counters corresponding to the shared memory. The aggregation may be performed by receiving via the slave interface of the shared memory the aggregated weighted sum from the master accumulation logic component of the processor engine and further accumulating the same with the weighted sum of the distributed events from the event counters corresponding to the shared memory.

In step 810, the excess power consumption of the execution unit, the processor engine, and the shared memory is determined by comparing the aggregated power consumption with a threshold power value. In step 812, the power consumption of the respective processing core or the shared memory is adjusted based on the determined excess power consumption. In some examples, the power consumption is adjusted via power throttling. A power throttling signal may be sent to the respective processing core or shared memory with excessive power consumption based on the determined excess power consumption. Specifically, the amount of power throttling may be proportional to the amount of excess power consumption by the execution unit, processor engine, and shared memory. The plurality of event count components in the execution unit, the processor engine, and the shared memory may be interconnectedly coupled via at least one ring bus.

Advantages in implementing the interconnected event counters and weighted sum accumulators as disclosed herein include a more efficient use of the events to track power usage with respect to the TDC and EDC of the cores, despite the former corresponding to thermally significant time frames and the latter to a much shorter, non-thermally significant time frames. The methods and systems disclosed herein also facilitate a more flexible and efficient calibration of the processor by using only a single calibration to encompass the power usage tracking of both TDC and EDC, which may vary depending on the type and implementation of the processor.

Furthermore, the methods and systems disclosed herein facilitate a more accurate measurement of the power usage and track the same with respect to the TDC and EDC limitations. As such, more of the EDC budget power may be used, causing a smaller performance margin. When it is determined that the power usage exceeds the threshold set based on the TDC limit or the EDC limit, power throttling is performed to adjust such power usage. Meeting the TDC and EDC power usage limitations facilitates higher performance in the processor for heavier workloads. In some examples, the use of a combined ring bus configuration for the event counters for monitoring power usage with respect to the TDC and EDC of the cores, that is, instead of having two separate sets of event counters, may also reduce the size of the overall processor system and thereby also improving the manufacturing efficiency of the processor system.

Although features and elements are described above in particular combinations, each feature or element can be used alone without the other features and elements or in various combinations with or without other features and elements. The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be mask works that are then used in a semiconductor manufacturing process to manufacture a processor which implements aspects of the embodiments.

The methods or flow charts provided herein may be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

In the preceding detailed description of the various embodiments, reference has been made to the accompanying drawings which form a part thereof, and in which is shown by way of illustration specific preferred embodiments in which the invention may be practiced. These embodiments are described in sufficient detail to enable those skilled in the art to practice the invention, and it is to be understood that other embodiments may be utilized, and that logical, mechanical and electrical changes may be made without departing from the scope of the invention. To avoid detail not necessary to enable those skilled in the art to practice the invention, the description may omit certain information known to those skilled in the art. Furthermore, many other varied embodiments that incorporate the teachings of the disclosure may be easily constructed by those skilled in the art. Accordingly, the present invention is not intended to be limited to the specific form set forth herein, but on the contrary, it is intended to cover such alternatives, modifications, and equivalents, as can be reasonably included within the scope of the invention. The preceding detailed description is, therefore, not to be taken in a limiting sense, and the scope of the present invention is defined only by the appended claims. The above detailed description of the embodiments and the examples described therein have been presented for the purposes of illustration and description only and not by limitation. For example, the operations described are done in any suitable order or manner. It is therefore contemplated that the present invention covers any and all modifications, variations or equivalents that fall within the scope of the basic underlying principles disclosed above and claimed herein.

The above detailed description and the examples described therein have been presented for the purposes of illustration and description only and not for limitation.

What is claimed is:

1. A processing system comprising at least one execution unit and at least one processor engine operatively coupled with the at least one execution unit, the at least one execution unit comprising:
    at least one first event count component configured to:
        monitor a plurality of distributed events in the execution unit, and
        calculate an accumulated weighted sum of the plurality of distributed events;
    a first master accumulation component coupled with the first event count component, the first master accumulation component configured to:
        determine an excess power consumption by comparing the accumulated weighted sum with a threshold power value, and
        adjust power consumption of the respective execution unit based on the determined excess power consumption; and
    the at least one processor engine comprising:
        a first slave interface operably coupled with the first master accumulation component, the first slave interface configured to receive the accumulated weighted sum from the first master accumulation component;
        at least one second event count component configured to:
            receive from the first slave interface the accumulated weighted sum,
            monitor a plurality of distributed events in the processor engine, and
            calculate a second accumulated weighted sum of the distributed events including the accumulated weighted sum from the first master accumulation component; and
        a second master accumulation component configured to:
            determine an aggregated power consumption for the execution unit and the processor engine based on the second accumulated weighted sum,
            determine the excess power consumption by comparing the aggregated power consumption with the threshold power value, and
            adjust power consumption of the respective execution unit or the processor engine based on the determined excess power consumption.

2. The processing system of claim 1, wherein:
    the threshold power value is selectable from one of a short-term power usage threshold or a long-term threshold,
    the first master accumulation component further comprises a first logic component configured to compare the accumulated weighted sum with the short-term power usage threshold and a second logic component configured to compare the accumulated weighted sum with the long-term power usage threshold, and
    the first logic component is configured to compare the accumulated weighted sum with the short-term power usage threshold simultaneously as the second logic component comparing the accumulated weighted sum with the long-term power usage threshold.

3. The processing system of claim 1, wherein the second master accumulation component further comprises a first logic component configured to compare the accumulated weighted sum with a short-term power usage threshold and a second logic component configured to compare the accumulated weighted sum with a long-term power usage threshold.

4. The processing system of claim 1, further comprising a plurality of processor engines and a cache memory coupled with the plurality of processor engines, the cache memory comprising:
    a second slave interface operably coupled with the second master accumulation component, the second slave interface configured to receive the aggregated power consumption from the second master accumulation component;
    at least one third event count component configured to:
        receive from the second slave interface the aggregated power consumption, monitor a plurality of distributed events in the cache memory, and
        calculate a third accumulated weighted sum of the distributed events including the accumulated weighted sum from the first master accumulation component and the aggregated power consumption from the second master accumulation component; and
    a third master accumulation component configured to:
        determine a second aggregated power consumption for the cache memory based on the third accumulated weighted sum,
        determine the excess power consumption by comparing the second aggregated power consumption with the threshold power value, and
        adjust power consumption of the respective execution unit, the processor engine, or the cache memory based on the determined excess power consumption.

5. The processing system of claim 4, wherein the third master accumulation component further comprises a first logic component configured to compare the accumulated weighted sum with a short-term power usage threshold and a second logic component configured to compare the accumulated weighted sum with a long-term power usage threshold.

6. The processing system of claim 4, further comprising:
an arbiter coupled with the third master accumulation component and configured to adjust the power consumption by sending a power throttling signal to one or more of the at least one execution unit, the at least one processor engine, or the cache memory based on the determined excess power consumption.

7. The processing system of claim 6, wherein the power throttling signal either (a) causes a reduction in instructions per cycle (IPC) of the one or more of the at least one execution unit, the at least one processor engine, or the cache memory based on the excess power consumption therein, or (b) is a pulse-width modulation (PWM) throttle signal sent to the one or more of the at least one execution unit, the at least one processor engine, or the cache memory based on the excess power consumption therein.

8. The processing system of claim 4, further comprising a plurality of first event count components, second event count components, and/or third event count components, wherein each respective set of event count components is interconnected via at least one ring bus.

9. A memory controller operatively coupled with a cache memory configured to be shared by a plurality of processing cores, each processing core of the plurality of processing cores comprising an execution unit and a processor engine, the memory controller configured to:
cause the respective processing core to:
monitor a plurality of distributed events in the execution unit and calculate an accumulated weighted sum of the plurality of distributed events using at least one first event count component,
and
determine an excess power consumption by comparing the accumulated weighted sum with a threshold power value and adjust power consumption of the execution unit based on the determined excess power consumption using a first master accumulation component; the memory controller configured to:
cause the respective processing core to:
receive the accumulated weighted sum from the accumulation component using a first slave interface operably coupled with the first master accumulation component,
receive from the first slave interface the accumulated weighted sum, monitor a plurality of distributed events in the proessor engine, and calculate a second accumulated weighted sum of the distributed events including the accumulate weighted sum from the first master accumulation component using at least one second event count component, and
determine aggregated power consumption for the execution unit and the engine based on the second accumulated weighted sum, determine the excess power consumption by comparing the aggregated power consumption with the threshold power value, and adjust power consumption of the execution unit or the process engine based on the determined excess power consumption using a second master accumulation component.

10. The memory controller of claim 9 wherein the threshold power value is selectable from one of a short-term power usage threshold or a long-term power usage threshold, and the memory controller is further configured to cause the respective processing core to simultaneously compare the accumulated weighted sum with the short-term power usage threshold and compare the accumulated weighted sum with the long-term power usage threshold, and the memory controller is further configured to:
cause respective processing core to simultaneously compare the accumulated weighted sum with the short-term power usage threshold and compare the accumulated weighted sum with the long-term power usage threshold.

11. The memory controller of claim 9, further configured to:
receive the second accumulated weighted sum from the second master accumulation component using a second slave interface operably coupled with the second master accumulation component,
receive from the second slave interface the aggregated power consumption, monitor a plurality of distributed events in the cache memory and calculate a third accumulated weighted sum of the distributed events including the accumulated weighted sum from the first master accumulation component and the aggregated power consumption from the second master accumulation component using at least one third event count component; and
determine a second aggregated power consumption for the cache memory based on the third accumulated weighted sum, determine the excess power consumption by comparing the second aggregated power consumption with the threshold power value, and adjust power consumption of the respective execution unit, the processor engine, or the cache memory based on the determined excess power consumption using a third master accumulation component.

12. The memory controller of claim 11, the memory controller further configured to cause an arbiter coupled with the third master accumulation component to adjust the power consumption by sending a power throttling signal to one or more of the at least one execution unit, the at least one processor engine, or the cache memory based on the determined excess power consumption,
wherein the power throttling signal either (a) causes a reduction in instructions per cycle (IPC) of the one or more of the at least one execution unit, the at least one processor engine, or the cache memory based on the excess power consumption therein, or (b) is a pulse-width modulation (PWM) throttle signal sent to the one or more of the at least one execution unit, the at least one processor engine, or the cache memory based on the excess power consumption therein.

13. The memory controller of claim 11, further coupled with a plurality of first event count components, second event count components, and/or third event count components, wherein each respective set of event count components is interconnected via at least one ring bus.

14. A method of controlling power consumption of a plurality of processing cores, the method comprising:
monitoring, using at least one event count component, a plurality of distributed events that occur within a respective processing core;
calculating an accumulated weighted sum of the distributed events from the event count component;

determining an excess power consumption by the respective processing core by comparing the accumulated weighted sum with a threshold power value; and adjusting power consumption of the respective processing core based on the determined excess power consumption, and wherein the distributed events are further monitored on a processor engine of the respective processing core using a plurality of event count components, and adjusting the power consumption of the respective processing core includes performing power throttling for the processor engine, the method further comprising:

determining an aggregated power consumption for an execution unit and the processor engine by aggregating the accumulated weighted sum from the plurality of event count components; and determining the excess power consumption by comparing the aggregated weighted sum with the threshold power value, wherein the plurality of event count components in the execution unit and the processor engine are interconnectedly coupled via at least one ring bus.

15. The method of claim 14, wherein the threshold power value is selectable from one of a short-term power usage threshold or a long-term power usage threshold, the distributed events are monitored on an execution unit of the respective processing core, and adjusting the power consumption of the respective processing core includes performing power throttling for the execution unit of the respective processing core.

16. The method of claim 14, wherein the distributed events are further monitored on a cache memory shared by the processing cores using the event count components, and adjusting the power consumption of the respective processing core includes performing power throttling for the shared cache memory, the method further comprising:

determining a second aggregated power consumption for the execution units, the processor engines, and the shared cache memory by aggregating the aggregated power consumptions from all of the processing cores; and determining the excess power consumption by comparing the second aggregated power consumption with the threshold power value, wherein the plurality of event count components in the execution units, the processor engines, and the shared cache memory are interconnectedly coupled via a plurality of ring buses.

17. The method of claim 16, further comprising sending a power throttling signal to the respective processing core based on a determined reduction of the power consumption, wherein (a) the power throttling signal causes a reduction in instructions per cycle (IPC) of the respective processing core based on the excess power consumption of the respective processing core, or the power throttling signal is a pulse-width modulation (PWM) throttle signal sent to the respective processing core based on the excess power consumption of the respective processing core.

* * * * *